United States Patent [19]

Karp

[11] Patent Number: 5,152,292
[45] Date of Patent: Oct. 6, 1992

[54] ADAPTIVE REJECTION FILTER FOR COLOR FLOW ULTRASOUND IMAGING

[75] Inventor: Sydney Karp, Somerville, Mass.

[73] Assignee: Hewlett-Packard Company, Palo Alto, Calif.

[21] Appl. No.: 633,718

[22] Filed: Dec. 20, 1990

[51] Int. Cl.$^5$ .............................................. A61B 8/00
[52] U.S. Cl. ........................... 128/661.08; 73/861.25; 128/660.07; 128/661.09
[58] Field of Search ...................... 128/660.02, 660.05, 128/660.06, 660.07, 661.09, 661.01, 661.08; 73/625, 861.25

[56] References Cited

U.S. PATENT DOCUMENTS

| | | | |
|---|---|---|---|
| 4,612,937 | 9/1986 | Miller | 128/661.09 |
| 4,676,105 | 6/1987 | Matzuk | 128/660.07 |
| 4,761,740 | 8/1988 | Lipschutz | 364/415 |
| 4,796,236 | 1/1989 | Welles, II et al. | 128/661.01 |
| 5,014,710 | 5/1991 | Maslak et al. | 128/661.09 |

Primary Examiner—Francis Jaworski
Assistant Examiner—George Manuel

[57] ABSTRACT

An adaptive flash rejection filter for a color flow imaging apparatus uses a flash strength identifier to make an initial determination of flash content. The identifier assigns a flash strength to each signal portion of a scan line according to a velocity component and a magnitude component of that signal portion. The number of flash strengths in a line which fall into a designated flash range are accumulated to arrive at an approximate measure of flash content. A filter arrangement uses the accumulated flash content to determine a proper flash rejection level for a line. An entire line of flash strengths and velocity measurements are stored in a line memory, which serves to delay those signals while the proper flash rejection level is being determined. The filter arrangement then receives the flash strengths and the velocity components, and inhibits an output of a velocity component if its corresponding flash strength exceeds the assigned flash rejection level. This serves to reject velocity components containing flash and prevent their processing by the color flow display circuitry.

27 Claims, 5 Drawing Sheets

ADAPTIVE REJECTION FILTER FOR COLOR FLOW ULTRASOUND IMAGING

BACKGROUND OF THE INVENTION

In the field of ultrasound medical imaging, displayed images are used which are actually a combination of two images. A first displayed image is a monochrome image which shows all stationary structures and some strong reflecting moving structures detected by the ultrasound apparatus. A second image, superimposed on the first, depicts all material detected by the ultrasound apparatus using more sensitive Doppler motion techniques. This second image is displayed in color on the display monitor to allow it to be discerned from the monochrome image.

A common use of the motion detection provided by the color flow image is in the detection of blood flow. Accurate detection of blood flow is desirable in many ultrasound examination procedures such as a cardiac examination or examination of the carotid artery. However, a recurring problem in color flow detection is the display of large areas of color arising from either spurious or unwanted motion detections. These large areas of color are commonly referred to as "flash", and can arise from movement of the ultrasound probe or from movement of the tissue within a patient's body. The unwanted flash usually makes it difficult or impossible to discern desired regions of color flow, and often obscures the monochrome image as well.

SUMMARY OF THE INVENTION

Because of the problem of flash in color flow imaging, it is desirable when assembling the flow image to remove flash from the image if possible. To determine which portions of an image to remove, it is necessary to ascertain which parts of the color image contain flash. Included in a color flow signal are a velocity component and a magnitude component. Flash signals are typically represented by a low velocity component. Clutter filtering, discussed hereinafter, removes most low velocity, low magnitude flash signals. However, high magnitude, low velocity flash signals can still get through. To identify these unwanted flash signals, a determination of flash content is made as a function of the magnitude and velocity components.

A flash rejection filter of the present invention determines a flash content of an overall group of signal portions such as a scan line or frame of the image signal. This flash content is used in determining the rejection of individual signal portions. Preferably, a rejection level is set based on the measured flash content. Each signal portion is then subjected to the rejection standard. If the flash strength of a signal portion exceeds the established rejection level, the velocity component of that signal portion is inhibited.

In a preferred embodiment, a rejection filter uses a flash identifier which receives the velocity component and the magnitude component, and generates a flash strength signal in response thereto. If the flash strength signal is within a predetermined range of flash strength signals, the identifier generates a flash indicator signal. The output of this signal indicates that a high probability exists that the signal portion being examined contains flash. The flash strength identifier may include a curve selection input by which a user defines the predetermined range of flash strength signals. Preferably, the flash strength identifier is a memory device which uses the velocity component and magnitude component inputs to form an address for locating the flash strength signal in memory.

The flash indicator signal is received by a flash accumulator which responds by increasing the value of an accumulated flash signal. This accumulated flash signal is received by a filter arrangement which responds by assigning a flash strength rejection level. The filter arrangement also receives the velocity component and the flash strength signal, and inhibits an output of the velocity component if a flash strength indicated by the flash strength signal exceeds the assigned flash strength rejection level.

In a preferred embodiment, the filter arrangement includes a memory device which receives the accumulated flash count from the flash counter and uses the count to form a memory address to locate and assign the rejection level. The memory device includes a reject strength input by which a user modifies how the count from the flash counter is used to form the memory address. The filter arrangement receives the flash strength signal and compares it to the assigned rejection level. If the flash strength of a signal portion exceeds the assigned rejection level, a clear output signal is generated. A velocity register of the filter arrangement which receives the clear signal also receives the velocity component. If the clear signal is received by the velocity register, the velocity component is inhibited.

In a preferred embodiment, the flash accumulator also includes a persistence signal modifier. The persistence signal modifier modifies the accumulated flash signal output to the filter arrangement by performing a weighted combination of the accumulated flash signal and a stored persisted signal. The weighted combination is the modified accumulated flash signal and is stored as a new persisted signal replacing the previously stored persisted signal. The accumulated flash signal as modified therefore deviates less from previous accumulated flash signals. This prevents drastic line-to-line or frame-to-frame variations in the accumulated flash signals, and tends to "smooth out" the rejection level over time.

Also in a preferred embodiment, a line memory device is provided to synchronize the transfer of the flash strength signals and velocity components with the setting of a rejection level derived from the signal portions containing those signals. The line memory device receives the velocity components and flash strength signals from the flash strength identifier, and stores them one group at a time, such as a line or a frame at a time. The output of the flash strength signals and the velocity components by the line memory device to the filter arrangement is synchronized with the changing of the rejection level.

One additional feature of a preferred embodiment is an input gain optimizer which receives attenuated magnitude components and depth measurement signals associated with the signal portions. The gain optimizer uses the depth measurement signals to compensate the magnitude components for depth attenuation prior to their input to the flash strength identifier.

An alternative embodiment, uses a direction component of the signal portion to specify a forward or reverse direction. The flash identifier determines the direction as well as the flash strength, and two measures of flash content are accumulated, one for the forward direction and one for the reverse direction. Each signal portion is then subjected to either a forward rejection level or a reverse rejection level depending on whether it is in the forward or reverse direction.

Another alternative embodiment of the present invention identifies flow content as well as flash content of a signal portion. The flash strength identifier outputs a flash indicator signal if the flash strength signal is within a first predetermined range, and outputs a flow signal if the flash strength is in a second predetermined range. Thus, both flash content and flow content are measured, and both are used is establishing a rejection level for a group of signal portions.

DETAILED DESCRIPTION OF THE PREFERRED EMBODIMENTS

The motion detections used in displaying a color flow image rely on pulsed doppler measurements from an ultrasonic probe. The occurance of flash in a color flow display is a result of spurious or unwanted doppler shift measurements. The presence of flash obscures the color and the monochrome images, and may disorient a person maneuvering the probe. Since desired velocity measurements are completely obscured by the presence of flash in the same region of the color display, display of any color image in those regions is of no practical use. Thus, the removal of all the color display in a flash region does not detrimentally affect the measurement, and prevents the obscuring of the monochrome image.

In ultrasound systems, an ultrasonic probe is used to generate and receive pulsed ultrasonic signals which penetrate the body of a patient. The signals are reflected at different points along their trajectory, creating echoes of different strengths. A reflection typically occurs at an interface between materials of different density, the strength of the reflection being proportional to the density difference. For performing pulsed doppler measurements, a series of pulsed ultrasonic signals are received from points along a line passing through the patient's body. A reflection from moving material results in a doppler shift of the reflected signal. Thus, motion at different depths in the body is apparent from doppler shifts present in the different echoes received.

Figure 1:
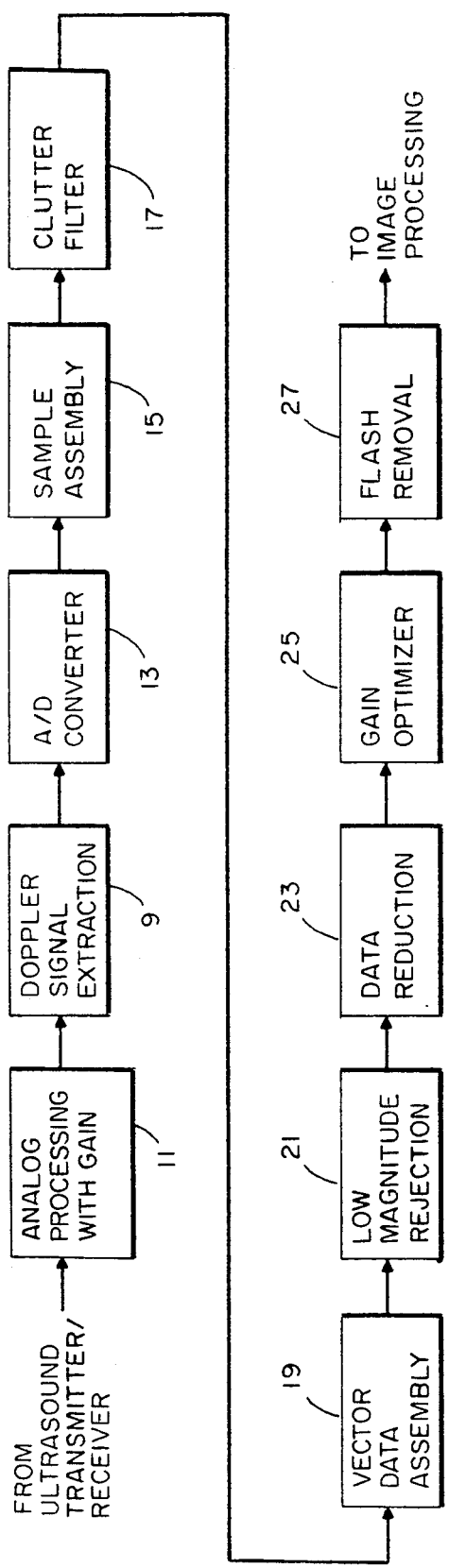
FIG. 1 is an overview of ultrasound pre-processing circuitry used with the present invention.

An overview of an ultrasound system which uses the present invention is shown in the block diagram of FIG. 1. Typically, a sequence of ultrasonic pulses separated in time are generated and received by an ultrasound transmitter/receiver. In the preferred embodiment, the number of sequential pulses used is eight. The received signal contains signal returns from different depths along the same trajectory through the body for each of the eight pulses. Thus, it is said that eight "lines" of data are received. The ultrasound signal returns are input to analog processing circuitry 11, which includes some gain control. This gain control compensates echo magnitude estimates for attenuation due to pixel depth, and is provided for image-enhancement purposes. Further analog processing (block 9) extracts the Doppler shift signal from the received signal.

The output signal of the Doppler signal extraction analog circuitry 9 is sampled by analog-to-digital (A/D) converter 13. The sampled signal is output to sample assembly circuitry 15 which includes a large memory device. The discrete samples from the A/D converter 13 are received in lines, and are reorganized and output by the sample assembly device 15 such that all the data from each of the different depth locations is grouped together. This data is then input to clutter filter 17.

Each of the groups of samples from a single depth location contains information as to echo, strength magnitude and Doppler phase shift associated for that location. Clutter filter 17 identifies the phase shift information for each group, and provides a corresponding attenuation of the magnitude of the samples. The attenuation curve of the clutter filter 17 is such that sample groups showing a smaller phase shift receive greater attenuation. Since the phase shift information is later used to determine velocity, the clutter filter has the effect of attenuating the sample magnitude of low velocity signal returns.

The output of the clutter filter 17 is input to vector data assembly circuitry 19. This circuitry uses a memory look-up table such as might be stored in an erasable programmable read-only memory (EPROM). The EPROM receives the attenuated samples and uses the look-up table to find corresponding vector representations for each. The output of the data assembly circuitry are signals each consisting of eight magnitude estimates and seven velocity estimates. The magnitude estimates are generated from the magnitudes of the eight samples. Each of the seven velocity estimates are generated from the relative phase shift between two successive samples. This vector data is then output to low magnitude rejection filter 21.

Low magnitude rejection filter 21 removes magnitude estimates which fall below a magnitude threshold of the filter 21. The filter also removes the velocity estimates generated using the sample from which that magnitude estimate was derived. The low magnitude rejection filter 21 together with the clutter filter 17 functions to remove low velocity/low magnitude signals from further processing. Since flash is typically made up of low velocity signals, this filter combination removes much of the unwanted low magnitude flash. However, some high magnitude/low velocity flash signals may still get through.

The output of low magnitude rejection filter 21 is input to data reduction circuitry 23. The data reduction circuitry 23 reduce the data into a line of pixels, each of which has a magnitude component and a velocity component associated with it. A magnitude component is a combination of the echo magnitude estimates for a particular depth location. A velocity component is formed from a combination of the velocity estimates for that location. The velocity estimates are also used to establish a direction component which is part of the velocity component. Typically the direction component is the most significant bit (MSB) of the velocity component. Since some of the magnitude estimates and the velocity estimates may be removed by the rejection filter 21, each location may not have all eight magnitude estimates and all seven velocity estimates remaining. However, the data reduction circuitry combines whatever estimates are available to generate the magnitude component and velocity component.

Once the magnitude and velocity components of a pixel are established, the magnitude components are passed through an optional gain optimizer 25. The gain optimizer is similar to the gain control of the analog processing circuitry 11. However, the gain optimizer 25 optimizes the magnitude components for flash reduction by the flash removal circuitry 27, rather than for display purposes.

In a preferred embodiment, the gain optimizer 25 is an EPROM which outputs a magnitude component which is modified depending on the depth of the associated pixel in the patient's body. The EPROM functions as a look-up table which uses the original magnitude value and the pixel depth as inputs to locate and output a new magnitude. In the preferred embodiment, the gain optimizer 25 provides an increase in gain for pixels at deeper depths. By compensating magnitudes with the gain optimizer 21, the attenuation of echo strength due to the depth of a pixel in the patient's body has no effect on the flash rejection applied by flash removal circuitry 27.

Flash removal circuitry 27 rejects signal portions containing low velocity, high magnitude flash. The effect of the clutter filter/low-level filter combination 15, 17 is to remove low magnitude, low velocity signals. However, flash consisting of low velocity, high magnitude signals may still get through this filter combination. Therefore, the flash rejection circuitry of the present invention is provided to help prevent this flash from being displayed on the color image of the system.

Figure 2A:
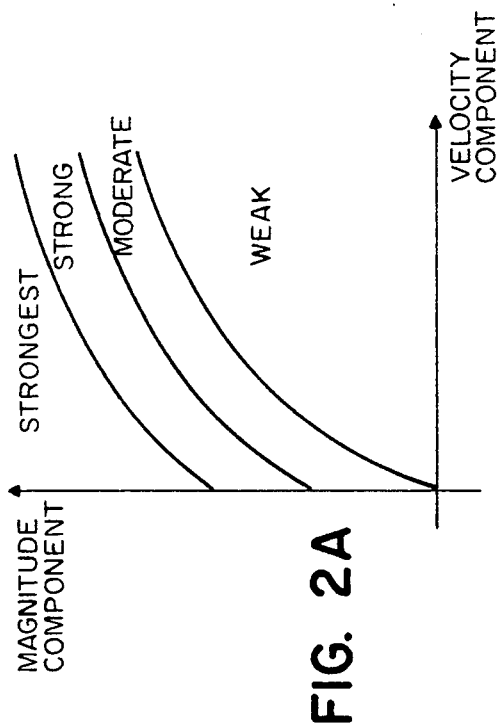
FIG. 2A shows a sample characteristic of curves used with the flash strength identifier EPROM of the flash rejection filter of FIG. 2.
Figure 2:
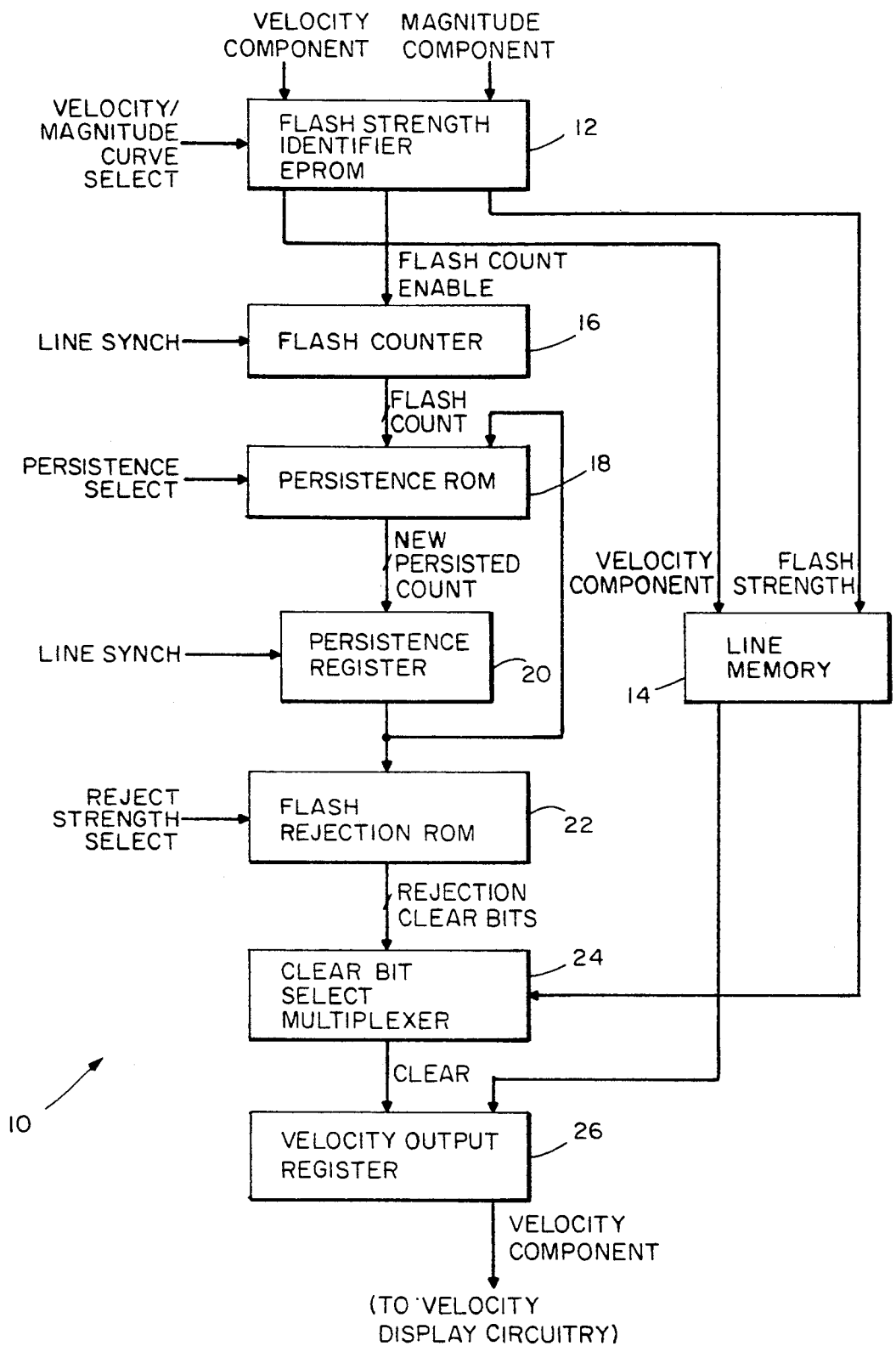
FIG. 2 shows a first embodiment of a flash rejection filter of the present invention.

A first embodiment of the flash removal circuitry 27 is shown in FIG. 2. The velocity and magnitude components of each signal portion, encoded in digital logic, are input to a flash strength identifier EPROM 12. The EPROM 12 is programmed as a look-up table which contains a number of different velocity/magnitude curves. Each velocity/magnitude curve represents a threshold for determining the likelihood that a signal portion contains a flash artifact. Since the flash artifacts to be removed are low velocity, high magnitude signals, typical velocity/magnitude curves of EPROM 12 are like those shown in FIG. 2A. Applying one of the curves of FIG 2A, it can be seen that signal portions with lower velocities and higher magnitudes tend to be represented by the region above the curve, while signal portions with higher velocities and lower magnitudes tend to fall below the curve.

Signal portions are input to the flash removal circuitry 27 in lines. In the preferred embodiment these signal portions are termed "pixels" each of which contains a velocity component and a magnitude component corresponding to a depth location for the line in question. For the purposes of description, the term "velocity component" is used to describe that component input to the flash removal circuitry which represents the magnitude of the velocity and the direction of the velocity. The term "magnitude component" refers to the component containing the echo strength magnitude of the pixel in question.

In the preferred embodiment, eight different tables, each containing three different curves are stored in the EPROM. The three curves serve to divide each look-up table into four different regions. As the velocity component and magnitude component are input to the EPROM 12, the pixel is assigned one of four different flash strengths corresponding to the region of the look-up table into which it falls. An example of four different flash strengths is given in FIG. 2A in which four flash strength regions are labelled "weak", "moderate", "strong", and "strongest." The flash strength assigned to a pixel is then encoded in 2-bits and output to line memory 14. The velocity is also output from the EPROM 12 to the line memory 14 with the flash strength output.

A velocity/magnitude select input is provided with the EPROM 12 and is used to designate a look-up table of the EPROM and one of the curves of the selected look-up table. The curve selected by a user is then used in establishing the initial likelihood of a pixel containing flash artifact. If the velocity and magnitude of a pixel (as designated by the velocity component and the magnitude component) place that pixel in a region above the designated EPROM curve, that pixel is determined to have a high likelihood of being flash, and a flash indicator signal is output to flash counter 16. For description purposes, the flash indicator signal will also be referred to as simply the "flash signal."

The counter 16 acts as a flash accumulator which increases the value of an accumulated flash signal each time a flash signal is received from the identifier EPROM 12. In the preferred embodiment, the flash counter is a digital counter, and the flash signal is delivered to the count enable input of the counter 16. Each time the flash counter 16 receives a flash signal from the EPROM 12, the counter output is incremented by one. The counting of pixels which are potential flash artifacts continues for an entire line of pixels. A line synchronization (line synch) input to the flash counter 16 is shown in FIG. 2 and provides a means for reinitializing the counter after an entire line is counted.

The output of the flash accumulating counter 16 could be input directly to a rejection filter arrangement. However, in the present embodiment, the counter output is input to persistence read-only memory (ROM) 18. The persistence ROM serves to "smooth out" an overall series of flash counts, such that individual lines which may have an abnormally high or low flash count do not become the only lines which are either rejected or accepted. It is desirable to reject or accept color in regions and not just single lines. For example, if all but one line was rejected as flash, then only a single line would appear on the display monitor. This single line would not be useful, and might confuse a system user. Therefore, it is desirable to give adjacent lines some relationship to each other to prevent this "line-by-line" rejection standard.

To perform the desired smoothing function, the persistence ROM uses persistence register 20. The persistence register 20 has a line synch input, and before the flash counter 16 is cleared by the line synch input, a "persisted count" is latched by the persistence register 20. The persisted count is generated by the persistence ROM, which receives the flash count and the persisted count stored by the persistence register 20. The persistence ROM 18 combines the flash count and the persisted count by some arithmetic weighting function. The specific arithmetic weighting function used by the persistence ROM may be modified by a user via a "persistence select" input to the persistence ROM 18. An example of such a function in the preferred embodiment is the following:

new persisted/count = ($\frac{1}{4}$) new count + ($\frac{3}{4}$) old persisted/count As each new line is counted, the effect of the new flash count is tempered by previous flash counts, and the persisted count tends to be a type of running average. In this way, the flash count for a line is adjusted to be dependent on previous flash counts to prevent wide range variations from line to line.

The persistence register 20 is a 5-bit storage register which outputs the stored persisted count to flash rejection ROM 22. The output of the persistence register 20 represents a flash count for an entire line which has been adjusted by the persistence function. This adjusted flash count is an approximate measure of the amount of flash present in a line, and is used by the flash rejection ROM 22 to determine the level of flash rejection necessary for the pixels of that particular line.

The actual rejection filtering is accomplished by a filter arrangement which includes flash rejection ROM 22, clear bit select multiplexer 24, and velocity output register 26. The flash rejection ROM 22 is a look-up table similar to that of flash identifier EPROM 12. The ROM 22 receives the 5-bit count from the persistence register 22 and correspondingly assigns one of a number of discrete rejection strength levels. The assigned rejection strength level is represented in a 4-bit output to clear bit select multiplexer 24. In the present embodiment, four different levels of flash rejection are provided by the ROM 22. Thus, the level assigned by the ROM is designated by how many of the 4 output bits of the ROM 22 are asserted.

The 2-bit flash strength measurements temporarily stored by line memory 14 are output to the multiplexer 24. Meanwhile, the velocity components are output by the line memory 14 to velocity output register 26. Each of the 2-bit flash strength measurements is received by the multiplexer 24, and used to select one of the four inputs from the flash rejection ROM 22. The flash strength of the pixel is encoded in the 2-bit select input, and the line rejection level is represented by the bits input to the multiplexer 24 from ROM 22. Thus, if the encoded flash strength level selects an input from the ROM 22 which is asserted (indicating that the encoded flash strength falls into the reject range), that asserted input is output to the clear input of velocity output register 26. This asserted input then disables the output of the register 26, preventing the velocity component of the pixel from being passed to the color flow display processing circuitry. In this sense, the multiplexer 24 performs a type of comparing function, providing an output indicative of whether the flash strength exceeds the assigned rejection level.

The flash strength identifier 12 alone could be used to inhibit the output of velocity components from the register. However, the embodiment of FIG. 2 goes beyond this to provide an adaptive flash rejection circuit which establishes an approximate flash level for a line of pixels, and then applies a corresponding flash rejection level to each pixel.

The correlation between the encoding of the flash strength and the selection of the output bits of the flash rejection ROM 22 is coordinated in the system. For example, a low persisted count usually corresponds to a weak rejection level. Thus, the ROM 22 may be such that only the first of the four ROM 22 output bits is asserted for such a level. The encoding of the flash strength level would then be such that only a high level flash strength would be represented by a code which would select the first data output bit from the ROM 22. Lower flash strengths would be represented by 2-bit codes which would select one of the other output bits from the ROM 22, and thus would not activate the clear input of the output register 26.

The characteristics of the flash rejection ROM 22 may be modified using a reject strength select input. The select input allows the threshold for asserting each bit of the 4-bit output to be independently controlled. This enables a user to change the look-up table assignments of the ROM 22 so the 4-bit output may be modified for different applications. This input therefore, in essence, allows the adjustment of the sensitivity of the flash rejection for each category of flash strength.

It is noted that to properly coordinate operation of the flash rejection circuit 10, it is necessary that the velocity and the flash strength data be delayed by the line memory 14. In the preferred embodiments, this is accomplished by making the line memory 14 large enough to store exactly one line of pixel information. The line memory 14 is a random access memory (RAM) which receives data inputs from the EPROM 12 at the same time it outputs data to the multiplexer 24 and velocity output register 26. When the last pixel data in a line has been processed by EPROM 12, the line synch inputs are activated to reinitialize flash counter 16 and load persistence register 20 with a new persisted count. Thus, the flash rejection ROM 22 assigns a rejection level to the line just as the first data elements from the line are being output by the line memory 14.

Figure 3:
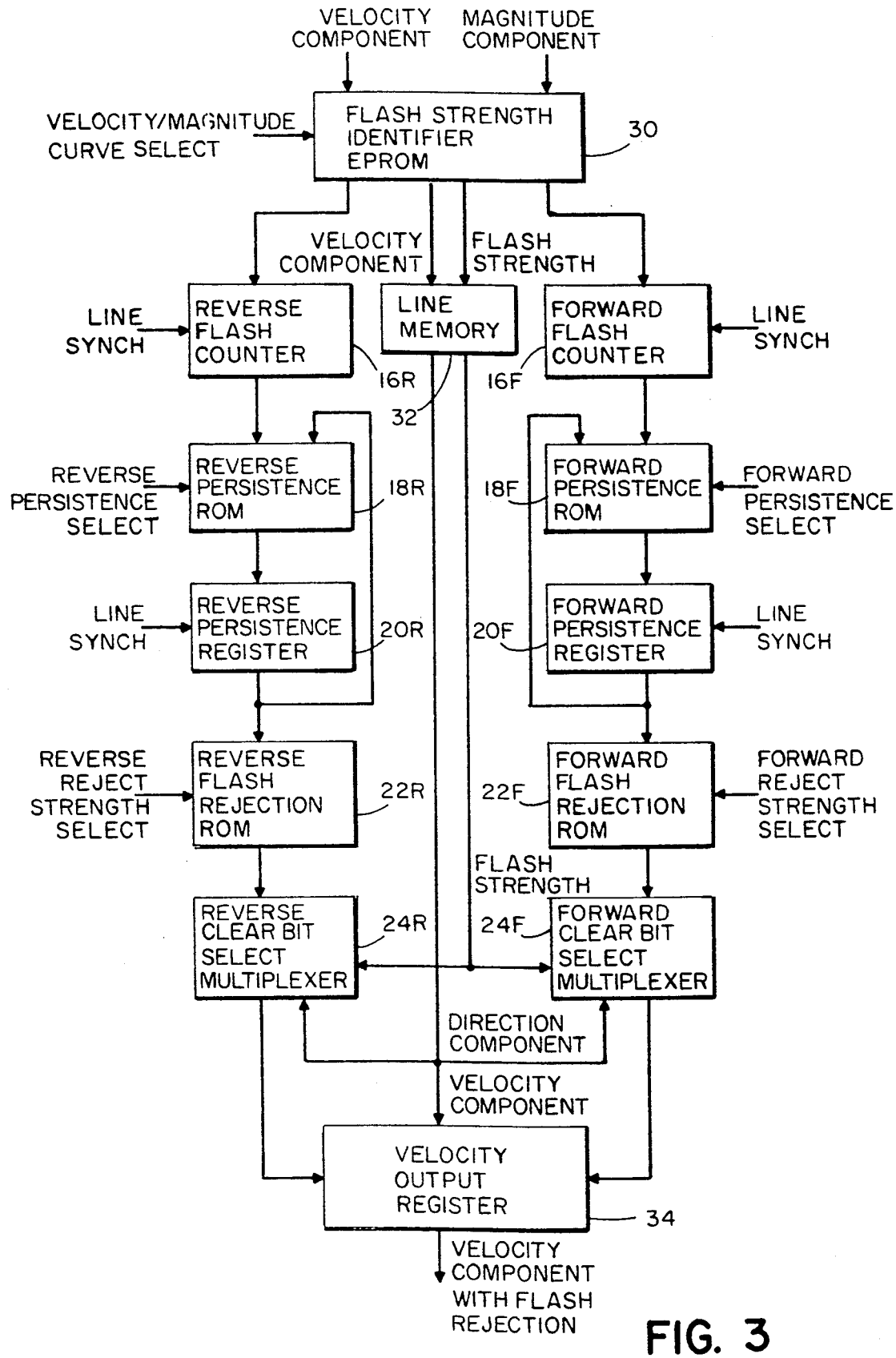
FIG. 3 shows a variation of the flash rejection filter of FIG. 2 which measures flash content in two directions.

Shown in FIG. 3 is another embodiment of a flash removal circuit 23 associated with the present invention. The embodiment of FIG. 3 is similar to that of FIG. 2, but takes into account the direction component of the pixels. Two different directions are designated by whether the MSB of the velocity component is asserted or not asserted. For the embodiment of FIG. 3, the two directions are designated forward and reverse. The left side of the circuit shown in FIG. 3 performs adaptive flash rejection for the reverse direction, while the right side of the circuit of FIG. 3 performs adaptive flash rejection for the forward direction. Each side of the FIG. 3 circuit functions in the same manner as the FIG. 2 embodiment, except it processes flash data for only one direction.

The FIG. 3 embodiment allows the adaptive flash rejection concept of the present invention to be extended to flash rejection in two directions. Since, at any point in time, high magnitude flash often occurs in only one direction or the other, separating the pixel information by direction allows better preservation of information relating to flow which is in the direction opposite to the direction of the flash information. For example, if one region has a large occurance of flash in the forward direction, while also having flow in the reverse direction, the forward flash may be rejected without rejecting any of the reverse flow information.

Flash strength identifier EPROM 30 is very similar to EPROM 12 of FIG. 2, but uses the direction bit of the velocity component in identifying flash. The flash strength of a pixel is encoded from the velocity and magnitude. For this encoding, the velocity/magnitude curve select input allows selection of a velocity/magnitude curve. In some applications it may be desirable to select separate curves for the two different directions. In such a case, the curve select input would be used to select both curves.

When the velocity component and magnitude component are received by the EPROM 30, the flash strength is encoded and compared to the velocity/magnitude curve. If the direction is reverse, and the flash strength falls in the rejection region of the selected curve, the reverse flash counter 16R is incremented. If the direction is forward, and the flash strength falls in the rejection region of the selected curve, the forward flash counter 16F is incremented. As a line of pixels is processed, the velocity component and flash strength of each is stored in line memory 32.

The reverse side and the forward side of the FIG. 3 embodiment each process the flash information in the same manner as the FIG. 2 embodiment. As shown in FIG. 3, the reverse persistence ROM 18R and the forward persistence ROM 18F each have their own persistence select, to allow a different persistence function to be used with each. Similarly, the reverse flash rejection ROM 22R and the forward flash rejection ROM 22F each have their own reject strength select, such that the desired rejection sensitivity may be set at different levels for the two different directions. However, the line synch inputs are all the same signal for controlling the reverse flash counter 16R, the forward flash counter 16F, the reverse persistence register 20R, and the forward persistence register 20F.

Once a line is completely processed, the persisted counts for the forward and reverse directions are output to the forward flash rejection ROM 22F and the reverse flash rejection ROM 22R, respectively. Each ROM 22F, 22R responds by generating its data output to its respective clear bit select multiplexer 24F, 24R. Since the flash counts for the forward and reverse directions may differ, and the reject strength select inputs for the ROMs 22F, 22R may also be different, the 4-bit reject level outputs may be different for the forward and reverse directions.

As the pixel information is output by the line memory 32, the direction output selects either the forward clear bit select multiplexer 24F or the reverse clear bit select multiplexer 24R. In the present embodiment, the direction bit selects one of the multiplexers 24F, 24R by disabling the other. Thus, the encoded flash strength measurement only elicits a response from the multiplexer which corresponds to the proper direction. This flash strength code thus selects one of the output bits of the ROM associated with that proper direction. The selected bit is then output to velocity output register 34, which inhibits the output of the velocity component if the bit indicates that the pixel contains flash artifact.

Figure 4:
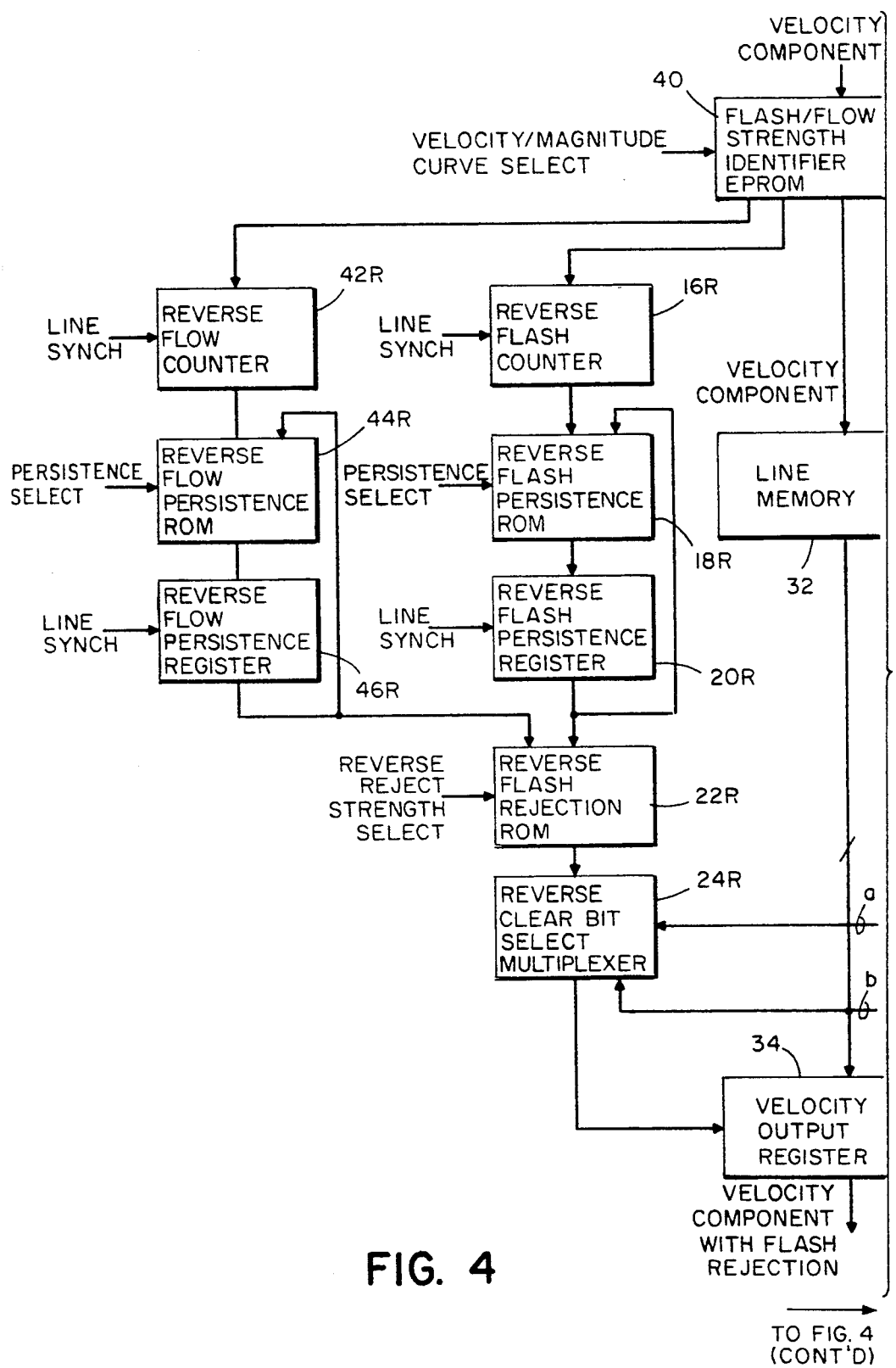
FIG. 4 shows another variation of the flash rejection filter of FIG. 2 which measures flash content and flow content in two directions.
Figure 4:
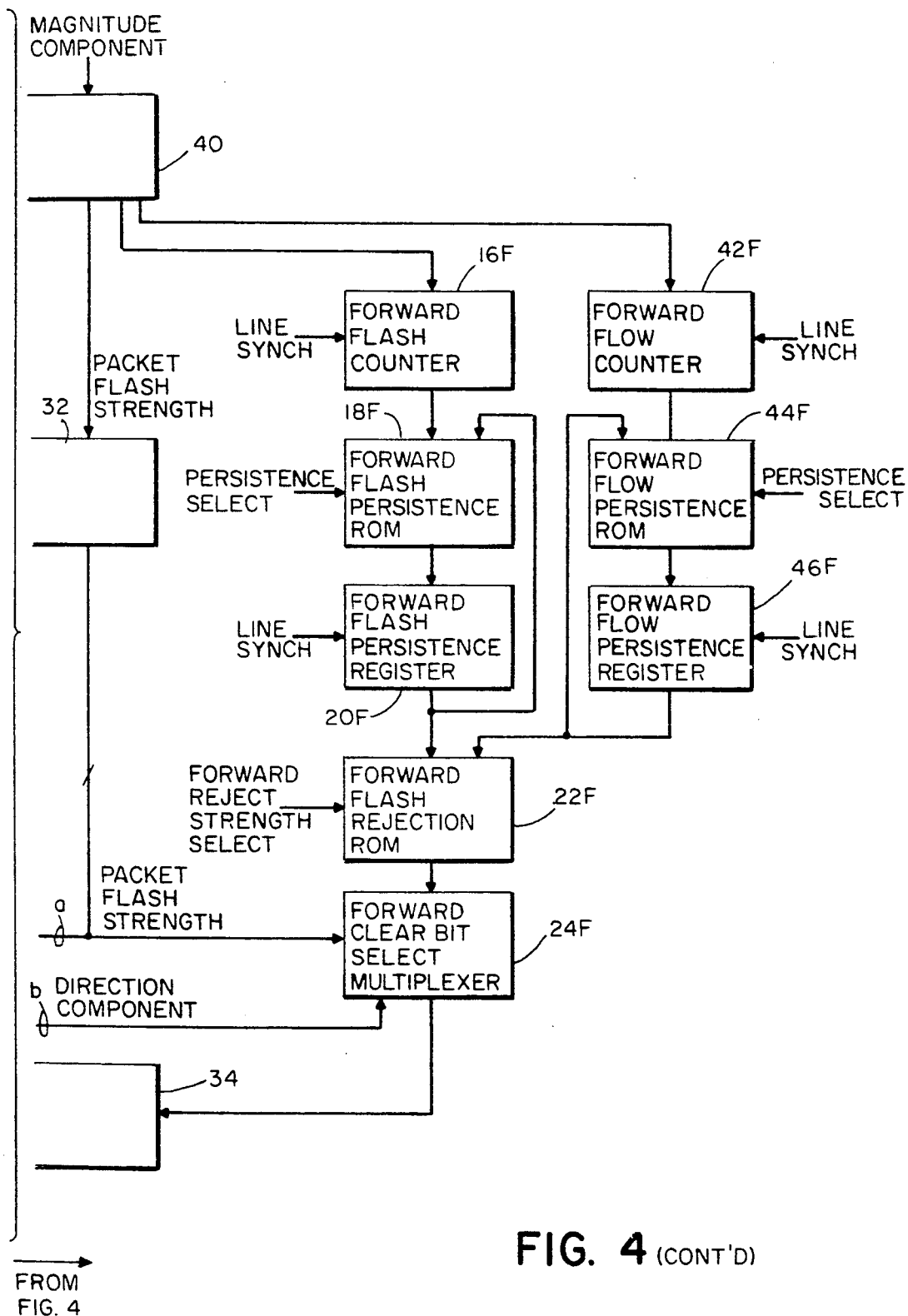

A further embodiment of the flash removal circuitry 23 associated with the present invention is shown in FIG. 4. The embodiment of FIG. 4 is essentially the same as the embodiment of FIG. 3, but in addition to determining the presence of flash, a determination is made as to the presence of flow information. A flash/-flow strength identifier EPROM 40 is provided at the input of the system, and receives the velocity and magnitude components. The EPROM 40 encodes the pixel flash strength in the same manner as the EPROM 30 of FIG. 3. However, the velocity/magnitude curve select input of the EPROM 40 allows the selection of at least two different curves, one for measuring flash and one for measuring flow. This allows levels to be set by a user for making an initial determination of whether a pixel is likely of being flash or flow. In some applications, the curve select input may even allow four different curves to be selected, allowing different standards to be set for measuring flash and flow in each of the two directions.

The curve select input of the EPROM 40 designates a flash curve and a flow curve. If the flash strength of a forward pixel is characterized by the EPROM look-up table as falling into the flash region, the forward flash counter is incremented. However, if the flash strength of a forward pixel falls into the flow region of the EPROM look-up table, an initial determination is made that the pixel information is likely to be flow information. In such a case, the EPROM 40 outputs a signal to the forward flow counter 42F to increment a forward flow count. A determination of reverse flash and reverse flow is made in the same manner, but occurs when the direction component designates the reverse direction. That is, an initial determination of reverse flash results in an incrementing of the reverse flash counter 16R, while an initial determination of reverse flow results in an incrementing of reverse flow counter 42R.

The curve select input to EPROM 40, allows different standards to be used for making an initial determination of flash or flow. The flash and flow standards are therefore set to best cooperate with each other. For example, the two curves may be selected to be the same curve, such that a pixel falling in the region above the curve is determined to be flash, while a pixel falling in a region below the curve is determined to be flow. Alternatively, the curves may have some region between them, such that some pixels could be characterized as neither flash nor flow. In some instances, it may even be desirable to overlap the curves, thus allowing a region in which a pixel could be characterized as both flash and flow. These standards of the EPROM are controlled by the user through the EPROM curve select input.

The flow counters of the FIG. 4 embodiment add additional data for use in setting the reject level for a particular line. The flow counters of the system operate in essentially the same manner as the flash counters, except that they count potential flow pixels rather than potential flash pixels. Each flow counter is followed by a flow persistence ROM 44F, 44R, and a flow persistence register 46F, 46R. The flow persistence ROMs 44F, 44R function in the same manner as the flash persistence ROMs 18F, 18R, but have their own persistence select inputs. This allows individual arithmetic weighting functions to be selected for each of the persistence ROMs 18F, 18R, 44F, 44R.

The flow persistence registers 46F, 46R each have a line synch input, as do the flow counters 42F, 42R. These line synch inputs are the same line synchs as used with the flash detection portions of the circuit. Thus, the transfer of data when the end of a line is reached is synchronized for each of the four counters 16F, 16R, 42F, 42R and each of the four persistence registers 20F, 20R, 46F, 46R.

At the end of a line, a new persisted count is loaded into each of the four persistence registers 20F, 20R, 46F, 46R. Thus, for each direction, a persisted flash count and a persisted flow count are input to the flash rejection ROM 48F, 48R for that direction. The flash rejection ROMs 48F, 48R are very similar to the flash rejection ROMs 22F, 22R of the FIG. 3 embodiment, but each receive inputs from both a flash persistence register 20F, 20R and a flow persistence register 46F, 46R. Each flash rejection ROM 48F, 48R has a reject strength select input which adjusts how the ROM look-up table translates the flash persisted count and the flow persisted count into a multi-bit output to its respective clear bit select multiplexer 24F, 24R. The clear bit select multiplexers 24F, 24R and the velocity output register 34 are essentially identical to that of the FIG. 3 embodiment, as is the line memory 32. Thus, the rejection of pixels is accomplished in the same manner as used in the previous embodiment.

The primary difference in the FIG. 4 embodiment, is the use of flow count information by the forward and reverse flash rejection ROMS 48F, 48R for assigning an appropriate flash reject level output. For either direction, an indication of the presence of flow data is used in determining the flash reject level. For example, if forward flash rejection ROM 48F receives a high forward flash persisted count while receiving a low forward flow persisted count, there is more reason to provide a lot of rejection. This follows since the absence of flow data indicates that the flash count has probably resulted from actual flash, and not from low velocity flow components which are sometimes found in a high velocity flow region. If the forward flash rejection ROM 48F receives a high flash persisted count while receiving a high flow persisted count, there exists a higher likelihood of actual flow data being present, and less rejection might be applied. Similarly, if the forward flash rejection ROM 48F receives a low flash count while receiving a high flow count, it is desirable to provide a very weak rejection level.

While the invention has been particularly shown and described with reference to a preferred embodiment thereof, it will be understood by those skilled in the art that various changes in form and details may be made therein without departing from the spirit and scope of the invention as defined by the appended claims. For example, the flash strength identifier 12 could alone be used as a non-adaptive flash removal circuit. The output of the velocity component could be inhibited when the flash strength exceeded the selected velocity/magnitude curve. This would remove the necessity of most of the remaining circuitry. However, the advantages of the adaptive rejection filter would be lost.

Another variation concerns whether the adaptive rejection is performed by lines or frames. The assigning of rejection levels for the described embodiments may be accomplished on a frame-to-frame basis rather than a line-to-line basis. In such a case, the line memory would be a frame memory capable of storing an entire frame of signals, and the line synchronization inputs would be frame synchronization inputs. Thus, an entire frame of pixels would be used to establish the desired rejection level, and all the signal portions of the frame would be subjected to the same rejection level.

Another variation of the present invention involves the use of a flow count in addition to a flash count with a system such as that of FIG. 2, which does not discern between velocity directions. This would provide a rejection level not dependent on velocity direction, but which uses data initially categorized as flash and flow in assigning the desired rejection level.

Another variation might use the flow count in place of the flash count. In some cases it might be desirable to set the rejection standard based only on a flow content. In such a case, the flash counter of FIG. 2 would be replaced with a flow counter. Thus, the output of velocity components would be inhibited only when the flow content was below an indicated rejection level, determined by the persisted flow count of the line.

I claim:

1. An ultrasound imaging system comprising: a rejection filter for filtering an ultrasound signal having a detected velocity component and a detected magnitude component, the filter having inputs connected to the ultrasound system for receiving the ultrasound signal and the filter inhibiting the velocity component of a signal portion of the ultrasound signal which has a flash strength which lies within a rejection region, the flash strength and the rejection region each being defined as a function of the detected velocity component and the detected magnitude component of said signal portion, and the filter having an output connected to the ultrasound system for sending the filtered ultrasound signal to the ultrasound system.

2. A rejection filter according to claim 1 wherein said filter receives a plurality of signal portions organized in a signal portion group, the filter inhibits the velocity components of any of the signal portions of the signal portion group if the flash strength of the signal portion lies within said rejection region, and the filter determines the rejection region as a function of the flash strengths of the signal portions of that signal portion group.

3. A rejection filter according to claim 1 wherein the filter receives a plurality of signal portions organized in a plurality of signal portion groups, and for each signal portion group the filter determines a corresponding flash content value defined as a function of the flash strengths of the signal portions of that signal portion group, and the filter determines the rejection region for the signal portions of each signal portion group by the flash content of that signal portion group.

4. A rejection filter according to claim 3 wherein the filter performs a persistence weighting function in determining the flash content of each signal portion group, the weighting function resulting in a persisted flash content measurement which is a weighted combination of the flash content of the signal portion group currently being filtered and the persisted flash content of a previously filtered signal portion group.

5. A rejection filter according to claim 3 wherein the filter compares the flash strength of each signal portion being filtered to the determined rejection region, and inhibits the output of a velocity component of that signal portion if the flash strength lies within the determined rejection region.

6. An apparatus for filtering an ultrasound imaging signal having a detected velocity component and a detected magnitude component, the apparatus comprising:

a flash strength identifier means for receiving the detected velocity component and the detected magnitude component and generating a flash strength signal in response thereto, the flash strength being defined as a function of the detected velocity and magnitude components, the identifier generating a flash indicator signal if the flash strength is within a predetermined region of velocity and magnitude values;

a flash accumulator means for receiving the flash indicator signal from the flash strength identifier means and modifying the value of an accumulated flash signal in response thereto; and a filter means for receiving the accumulated flash signal from the flash accumulator and assigning a flash strength rejection level in response thereto, the filter means also receiving the velocity component and the flash strength signal and inhibiting an output of the velocity component if a value of flash strength indicated by the flash strength signal exceeds the assigned flash strength rejection level.

7. An apparatus according to claim 6 wherein the flash strength identifier means is a memory device, and the velocity component input and the magnitude component input combine to form an address for locating in memory the flash strength of the flash strength output signal.

8. An apparatus according to claim 6 wherein said predetermined range of flash strength signals is defined by a curve selection input to the flash strength identifier.

9. An apparatus according to claim 6 wherein the filter means further comprises group receiver means for receiving a plurality of signal portions organized in a signal portion group, and assigns a rejection level which is used for all the signal portions of that signal portion group.

10. An apparatus according to claim 9 wherein the group receiver means receives a signal portion group comprising signal portions corresponding to one image line.

11. An apparatus according to claim 9 wherein a line synchronization input is provided to the flash accumulator to reset the counter after the last signal portion of a group is processed by the flash strength identifier.

12. An apparatus according to claim 9 wherein
the flash strength identifier means receives the velocity component and magnitude component and generates a flash strength signal for each signal portion of the signal portion group,
the flash accumulator means receives and accumulates the flash strength signal from the flash strength identifier means for each signal portion of the signal portion group, and
the filter means receives the accumulated flash strength signal from the flash accumulator only after all the signal portions of the signal portion group are processed by the flash strength identifier producing corresponding flash strength signals, and all the flash strength signals corresponding to the signal portions of the signal portion group have been accumulated by the flash accumulator means.

13. An apparatus according to claim 6 wherein the filter means comprises a memory device, and the accumulated flash signal from the flash accumulator addresses data stored in the memory device which indicates the assigned flash strength rejection level.

14. An apparatus according to claim 6 wherein the filter means compares the flash strength signal and the assigned rejection level, and outputs a clear signal if a flash strength indicated by the flash strength signal exceeds the assigned rejection level.

15. An apparatus according to claim 6 further comprising a persistence signal modifier means which receives the accumulated flash signal from the flash accumulator means and generates a persisted accumulated flash signal by taking a weighted average of the accumulated flash signal and a stored persisted accumulated flash signal retained by the signal modifier means.

16. An apparatus according to claim 6 further comprising an input gain optimizer means which receives a magnitude component and a depth measurement signal associated with that magnitude component, the gain optimizer means compensating for the attenuation of the magnitude component as a function of the depth measurement signal, the gain optimizer means outputting a compensated magnitude component to the flash strength identifier means as said magnitude component.

17. An apparatus according to claim 6 wherein the flash strength identifier means generates a flow signal if the flash strength is within a second predetermined region of velocity and magnitude values, and wherein the apparatus further comprises a flow accumulator means for receiving the flow signal from the flash identifier means and modifying the value of an accumulated flow signal in response thereto, the filtering means receiving the accumulated flow signal and using both the accumulated flash signal and the accumulated flow signal in assigning the flash strength rejection level.

18. An apparatus according to claim 6 wherein the flash accumulator means is a forward flash accumulator and the filter means is a forward filter arrangement, and wherein the apparatus further comprises a reverse flash accumulator and a reverse filter arrangement, the flash strength identifier means receiving a direction component as part of the velocity component and outputting a reverse flash signal to the reverse flash accumulator if the flash strength is within a predetermined region of velocity and magnitude values and the direction component indicates a reverse direction.

19. An apparatus for filtering an ultrasound imaging signal having a detected velocity component and a detected magnitude component, the imaging signal being organized as a plurality of lines each of which contains a plurality of signal portions forming a signal portion group, and a line synchronization signal, the apparatus comprising:
a flash identifier memory device having an input for receiving the detected velocity component and the detected magnitude component of the ultrasound imaging signal, and the flash identifier memory device generating and outputting a flash strength signal in response thereto, the memory device further generating and outputting a count signal if the generated flash strength signal is within a flash strength region specified by a selectable input to the memory device;
a line memory device having inputs for receiving the detected velocity component of the ultrasound imaging signal and the flash strength signal output by the flash identifier memory device, the line memory generating and outputting a delayed velocity component and a delayed flash strength signal;
a flash counter having an input for receiving the count signal output from the flash strength identifier memory device, the flash counter incrementing a flash count in response thereto, the flash counter also having a line synchronization input for receiving the line synchronization signal which causes reinitialization of the flash counter after the last imaging signal portion of a line is processed by the flash strength identifier memory device;
a persistence memory device having inputs for receiving the flash count from the flash counter and a stored persisted count from a persistence register, the persistence memory device outputting a new persisted count in response thereto;
a persistence register having inputs for receiving the new persisted count from the persistence memory and for receiving the line synchronization signal which causes storing of the new persisted count as the stored persisted count in the persistence register after the last imaging signal portion of a line has been received by the flash strength identifier memory device, the persistence register outputting the stored persisted count to the persistence memory device as said stored persisted count;

a flash strength memory device having an input for receiving the stored persisted count and the flash strength memory device generating and outputting a rejection level signal in response thereto;

a reject multiplexer having inputs for receiving the rejection level signal from the flash strength memory device and the delayed flash strength signal from the line memory device and the reject multiplexer generating and outputting a clear signal output if a flash strength represented by the delayed flash strength signal exceeds a rejection level represented by the rejection level signal; and a velocity register having an input for receiving the delayed velocity component from the line memory device and the clear signal from the rejection multiplexer, the velocity register inhibiting an output of the delayed velocity component when the clear signal is received.

20. An apparatus according to claim 19 wherein the flash strength identifier memory device output a flow count signal if the flash strength signal is within a flow strength region different than said flash strength region, and wherein the apparatus further comprises a flow counter having an input which receives the flow count signal from the flash identifier, and the flow counter increments a flow count of the flow counter in response thereto.

21. An apparatus according to claim 20 further comprising a flow persistence memory device and a flow persistence register, and flow persistence memory device having an input for receiving the flow count from the flow counter and a stored persisted flow count from the flow persistence register, and the flow persistence memory device generating a new persisted flow count from a weighted combination of the flow count and the stored persisted flow count, the new persisted flow count being output to the persistence register.

22. An apparatus according to claim 21 wherein the flow count is output to the flash rejection memory device, and the flash rejection memory device uses the stored persisted flow count along with the stored persisted flash count in generating said rejection level signal.

23. In an ultrasound imaging system, a method of filtering a signal having a detected velocity component and a detected magnitude component, the method comprising:

measuring a flash strength of a signal portion of the signal as a function of the velocity component and magnitude component of the signal portion; and inhibiting an output of the velocity component of the signal portion if the measured flash strength lies within a set rejection region defined as a function of the velocity component and magnitude component of the signal portion.

24. A method according to claim 23 wherein said signal portion is part of a signal portion group which contains other signal portions of the signal, the method comprising:

measuring a flash content of the group of signal portions as a function of the flash strengths of the signal portions of said signal portion group; and inhibiting the velocity components of the signal portions of said signal portion group only if the measured flash content of the signal portion group lies within said rejection region.

25. A method according to claim 23 wherein said signal portion is part of a signal portion group which contains other signal portions, the method comprising:

generating an accumulated flash signal by accumulating measurements of flash strength for the signal portion group; and assigning said rejection region as a function of the accumulated flash signal.

26. A method according to claim 25 further comprising providing persistence weighting to the accumulated flash signal by generating a persisted accumulated flash signal which is used in assigning said rejection level, and which results from a weighted combination of the accumulated flash signal with a previously stored persisted accumulated flash signal.

27. A method of filtering an ultrasound imaging signal having a detected velocity component and a detected magnitude component, the method comprising:

providing a flash strength identifier which receives the velocity component and the magnitude component, the flash strength identifier generating a flash strength signal in response thereto, and the flash strength identifier generating a flash indicator signal if the flash strength signal is within a predetermined region of velocity and magnitude values;

receiving the flash indicator signal with a flash accumulator and modifying the value of an accumulated flash signal in response thereto;

providing a filter arrangement which receives the accumulated flash signal and assigns a flash strength rejection level in response thereto; and receiving the velocity component and the flash strength signal with the filter arrangement and inhibiting an output of the velocity component if a value of flash strength indicated by the flash strength signal exceeds the assigned flash strength rejection level.

* * * * *